United States Patent [19]

Sakamoto et al.

[11] Patent Number: 5,771,406
[45] Date of Patent: Jun. 23, 1998

[54] CAMERA WITH A SHIFT OPTICAL SYSTEM RESPONSIVE TO AN EXTERNAL DEVICE

[75] Inventors: Hiroshi Sakamoto, Kawasaki; Sueyuki Ohishi, Tokyo, both of Japan

[73] Assignee: Nikon Corporation, Tokyo, Japan

[21] Appl. No.: 760,133

[22] Filed: Dec. 3, 1996

Related U.S. Application Data

[63] Continuation of Ser. No. 354,810, Dec. 8, 1994, abandoned.

[30] Foreign Application Priority Data

Dec. 10, 1993 [JP] Japan .................................. 5-341583

[51] Int. Cl.⁶ .................................................. G03B 17/00
[52] U.S. Cl. ................................................................ 396/55
[58] Field of Search ................................... 396/52, 53, 54, 396/55, 429

[56] References Cited

U.S. PATENT DOCUMENTS

| | | | |
|---|---|---|---|
| 5,084,724 | 1/1992 | Maeno ..................................... | 354/430 |
| 5,117,246 | 5/1992 | Takahashi et al. ........................ | 396/55 |
| 5,192,964 | 3/1993 | Shinohara et al. ........................ | 396/55 |
| 5,237,363 | 8/1993 | Okada et al. ............................. | 354/412 |
| 5,270,857 | 12/1993 | Oizumi et al. ........................... | 359/554 |
| 5,416,554 | 5/1995 | Hamada et al. ......................... | 354/400 |
| 5,479,236 | 12/1995 | Tanaka ..................................... | 396/55 |
| 5,537,185 | 7/1996 | Ohishi et al. ............................. | 396/55 |
| 5,587,764 | 12/1996 | Nakamura et al. ....................... | 396/55 |

Primary Examiner—Eddie C. Lee

[57] ABSTRACT

An improved shift optical system for a camera which is adapted to be responsive to input received from devices external to the system. An anti-vibration optical system, constituting the shift optical system, is provided so as to be movable on a plane perpendicular to the optical axis of the anti-vibration optical system by a driver. The action of the driver is controlled by a control device which is responsive to input from either an anti-vibration system or an external device. The anti-vibration system of the camera is provided with an image blur detector, which outputs the amount of vibration experienced by the camera, and a compensation amount calculator which outputs a signal to the control device indicative of where the anti-vibration optical system must be placed in order to compensate for vibrations. In order to interface with the external equipment, the control device is connected to a coordinate converter which receives information via a communication device connected to the external equipment. The coordinate converter allows the use of external equipment having a coordinate system that is either of a different scale or skewed from that coordinate system the control device. In operation, the control device accepts and acts upon information from either the anti-vibration system or the external equipment. The external equipment can be, for example, a test device which measures the responsiveness of the anti-vibration optical system over its entire range of movement. Further, the external equipment can be a pattern generating device which directs the anti-vibration optical system to move in a preset sequence to create a pattern of light on a photograph.

15 Claims, 3 Drawing Sheets

CAMERA WITH A SHIFT OPTICAL SYSTEM RESPONSIVE TO AN EXTERNAL DEVICE

This application is a continuation of application Ser. No. 08/354,810, filed Dec. 8, 1994, now abandoned.

BACKGROUND OF THE INVENTION

1. Field of the Invention

The present invention relates to a shift optical system for a camera, and, more particularly, to an anti-vibration device that controls an anti-vibration optical system movable in a direction approximately perpendicular to an optical axis of the anti-vibration optical system.

2. Description of the Related Art

A shift optical system is an optical system which is movable on a plane orthogonal to an optical axis. Anti-vibration devices for cameras, which correct for blur in an image by shifting an optical axis of an anti-vibration optical system, are typical implementations of a shift optical system. FIG. 4 shows a block diagram of the basic configuration of an anti-vibration device according to the prior art. An anti-vibration optical system 1, i.e. the shift optical system, comprises, for example, a photographic optical system that has a plane of movement approximately perpendicular to the optical axis. The anti-vibration optical system is configured in such a manner that imaging capability is not effected if the optical axis is shifted to cancel camera vibration.

A driving device 2 is provided to drive the anti-vibration optical system 1 within a plane approximately parallel to the imaging plane, i.e. perpendicular to the optical axis of the anti-vibration optical system. The driving device 2 has independent drivers, i.e. actuators, for each of two axis that cross at right angles within the plane of movement. An actuator of a motor may be used for the driving device 2.

An image blur detector 3 is provided to detect image blurring caused by vibration, and may comprise, for example, an angular velocity sensor. The output of the blur detector 3 is transmitted to a compensation amount calculator 4 which calculates the amount of compensation need to cancel the detected blurring, corresponding to the focal length or the object distance. The output of the compensation amount calculator 4 is transmitted to a control device 6.

An encoder 5 is provided for detecting the amount of movement of the anti-vibration optical system 1 or the driving device 2. The output of the encoder 5 is transmitted to the control device 6.

The control device 6 calculates the optimum drive direction and amount, using the output of the encoder 5 as feedback, based on the compensation amount obtained from the compensation amount calculator 4, and controls the driving device 2 accordingly.

The conventional anti-vibration device, as shown in FIG. 4 is designed to be controlled by calculating the drive amount of the anti-vibration optical system 1 needed based on a detected amount of camera vibration. As such, it is not able to send a command as to either a desired compensation amount or the drive position to external equipment. Therefore, it is not possible to use external equipment to test the anti-vibration optical system for any problems over the possible shift area during inspection in the manufacturing process. Further, if the position of the anti-vibration optical system 1 were directly controllable by external equipment, it would also be possible to provide new special effects in photographs.

SUMMARY OF THE INVENTION

Accordingly, it is an object of the present invention to provide an improved shift optical system driver that can be easily tested to determine if the shift optical system can operate over the entire shifted area without problems.

It is another object of the present invention to provide an improved shift optical system driver that accepts input from an external equipment regarding the desired position of the shift optical system.

It is yet another object of the present invention to provide a shift optical system which is controllable to produce special effects in an image.

It is another object of the present invention to provide a control device that can move a shift optical system to the set position via a driving unit based on input from external equipment, enabling special photography effects.

It is another object of the present invention to provide a shift optical system whose movement can be controlled externally for use in an anti-vibration device having a control unit and a driving unit, thereby allowing the anti-vibration device to be tested by moving the shift optical system randomly.

It is yet another object of the present invention to provide an anti-vibration device wherein anti-vibration operation may be inhibited to enable the testing of an anti-vibration optical system.

It is a further object of the present invention to provide an optical system positioning device having an input unit and a coordinate converter which converts data received by the input unit to data usable by the optical system positioning device.

It is yet a further object of the present invention to provide an optical system positioning device equipped with a communication device to allow connection to external equipment.

It is another object of the present invention to provide an optical system positioning device equipped with a communication unit and a coordinate converter to allow communication with external equipment such as a testing device, an electronic diary book, or a personal computer, which utilizes a different coordinate system.

It is yet another object of the present invention to provide a shift optical system whose position is detected by an encoder which outputs a signal indicating the position of the shift optical system to external equipment.

It is yet another object of the present invention to provide a shift optical system whose position is detected by an encoder which outputs the current position of the shift optical system to external equipment capable of calculating the speed and acceleration of the shift optical system.

Additional objects and advantages of the invention will be set forth in part in the description which follows, and, in part, will be obvious from the description, or may learned by practice of the invention.

Objects of the present invention are achieved by providing an optical system comprising a shift optical system movable on a plane perpendicular to the optical axis, a control device for controlling the movement of the shift optical system, and an optical system positioning device adapted to provide the control device with a signal indicative of a desired position of the shift optical system in response to a signal from an external equipment.

Objects of the present invention may also be achieved by providing an optical system comprising a shift optical system movable on a plane perpendicular to the optical axis, a control device for controlling the movement of the shift optical system, an optical system positioning device including a communication device for outputting and receiving a signal from an external equipment and a coordinate converter connected between the control device, the coordinate converter converting the signal from the external equipment to a signal indicative of a desired position for the shift optical system and outputting the signal to the control device, and a position detection device that outputs a signal indicative of the current position of the shift optical system to the control device.

Objects of the present invention are further achieved by providing a driver for a shift optical system having an optical axis, for use in a camera, the driver comprising an actuator for moving the shift optical system on a plane perpendicular to the optical axis, and a control device responsive to an external equipment for causing the actuator to move the shift optical system to a desired position.

Objects are further achieved by providing a method of flash photography comprising moving an optical system during exposure to produce a pattern on an image plane.

Objects of the present invention may also be achieved by providing a camera comprising a shift optical system movable in a direction approximately perpendicular to an optical axis, a driver that drives the shift optical system to a desired position, a control device that controls the driver, and an optical system positioning device that externally sets the position to which the control device causes the driver to drive the shift optical system.

Objects of the present invention may also be achieved by providing a camera comprising a shift optical system movable in a direction approximately perpendicular to an optical axis, a driver for driving the shift optical system to a desired position, a blur detector that detects vibrations in a camera, a compensation amount calculator for calculating the amount the optical system must be moved to compensate for the vibration detected by the blur detector, a control device that controls the amount the shift optical system is moved by the drive unit, and an optical system positioning device that externally sets a position in the control device to which the shift optical system is to be moved.

Objects of the present invention are further achieved by providing a camera having an optical system driver which inhibits anti-vibration control based on the output of a compensation amount calculator when the output of the compensation amount calculator is valid, and when the output of the compensation amount calculator is valid controlling the movement of a shift optical system based on the output from an optical system positioning device.

Objects of the present invention are also achieved by providing a camera comprising an optical system driver, an optical system positioning unit equipped with an input unit which receives command information from external equipment, and a coordinate converter that converts the command information to position information for driving the shift optical system.

Objects of the present invention are further achieved by providing a camera having a communication device that receives command information from external equipment.

Objects of the present invention are further achieved by providing a camera comprising a communication device capable of receiving command information from different types of external equipment, and a coordinate converter for performing optimum coordinate conversion on the command information received from the external equipment using a common coordinate system.

Objects of the present invention are also achieved by providing a camera comprising an encoder that detects the position of a shift optical system and transmits information indicating that the shift optical system has reached a desired position to external equipment.

Objects of the present invention are further achieved by providing a camera comprising an encoder that detects the position of a shift optical system and transmits the current position of the shift optical system to external equipment.

BRIEF DESCRIPTION OF THE DRAWINGS

These and other objects and advantages of the invention will become apparent and more readily appreciated from the following description of the preferred embodiments, taken in conjunction with the accompanying drawings of which.

DESCRIPTION OF THE PREFERRED EMBODIMENTS

Figure 1:
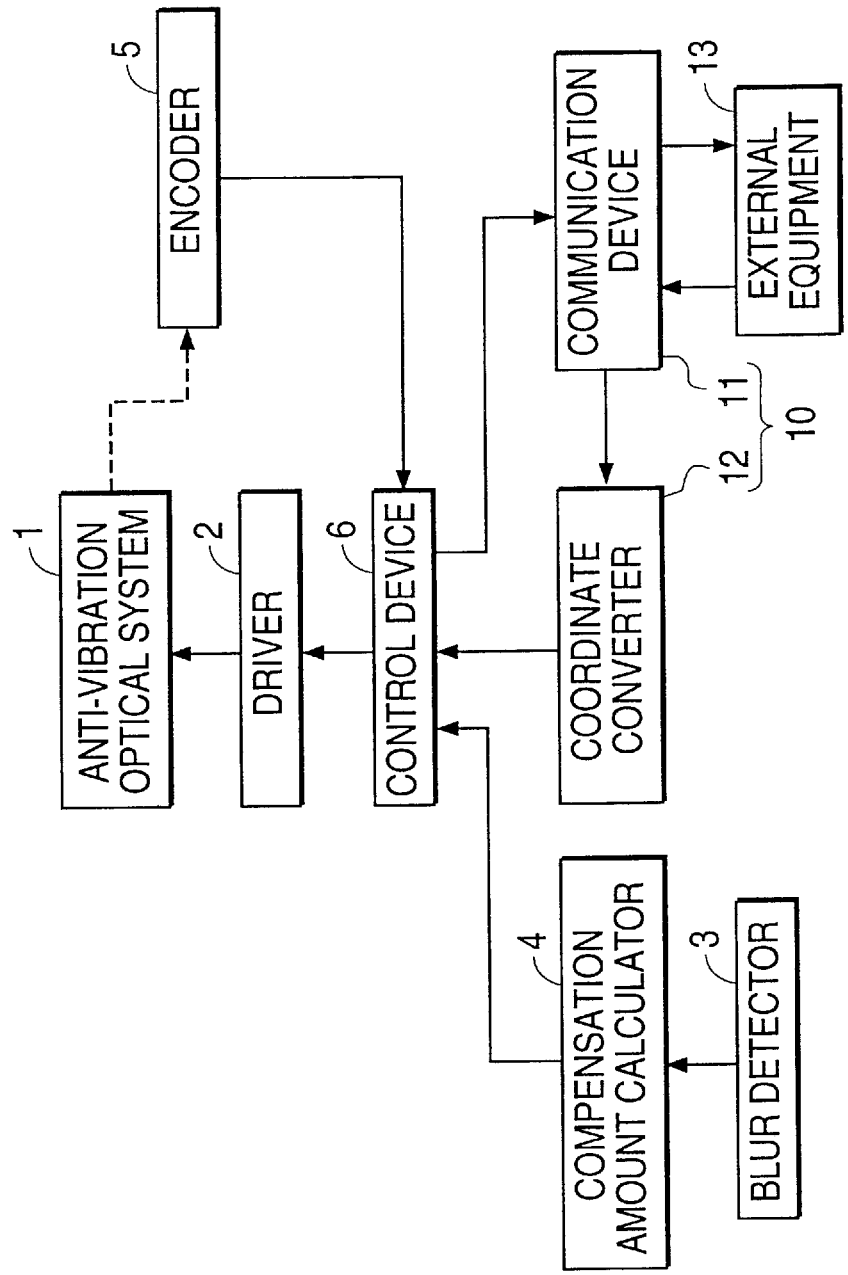
FIG. 1 is a block diagram of a shift optical system driver in accordance with a first embodiment of the present invention.

Reference will now be made in detail to the present preferred embodiments of the present invention, examples of which are illustrated in the accompanying drawings, wherein like reference numerals refer to like elements throughout.

FIG. 1 is a block diagram showing a configuration of an anti-vibration device, for use in a camera, in accordance with a first preferred embodiment of the present invention. An optical system positioning device 10, which allows external control of the movement of an anti-vibration optical control system 1, i.e. a shift optical system, having an optical axis is provided independently from an anti-vibration system comprised of an image blur detector 3 and a compensation amount calculator 4. The optical system positioning device 10 interfaces with a control device 6 to supply desired location information for the anti-vibration optical system 1. The control device 6 uses this location information to drive a driver 2 to move the anti-vibration optical system 1 into the desired location.

According to the first preferred embodiment, the optical system positioning device 10 is provided with a communication device 11 connected to one or more pieces of external equipment 13. The external equipment 13 may, for example, be a testing device, a memory device, a personal computer, or any number of external devices related to photography. The optical system positioning device 10 is also provided with a coordinate converter 12 to obtain the necessary driving data, based on the information provided by the external equipment 13, via the communication device 11.

The location information provided by the external equipment 13, in the first preferred embodiment, is in XY-coordinate form, indicating a location as a distance from an optical axis, that moves corresponding to the movement of the anti-vibration optical system 1. The coordinate system has a Y axis in the vertical direction and an X axis in the horizontal direction with the center of the imaging plane as the origin. Values on the coordinate system are given, for example, in $\mu$m for the XY-coordinate data in a serial data format in order to facilitate future expansion. In addition to the XY-coordinates data, command data which provides the driving commands, are transmitted in a set with the information provided by the external equipment 13. Conversion of the coordinate system is necessary if the coordinate systems that are used by the external equipment 13 and the driver 2, do not match, for example, if an axis in the antivibration optical system 1 is tilted with respect to the coordinate system that is being used by the external equipment 13.

Figure 2:
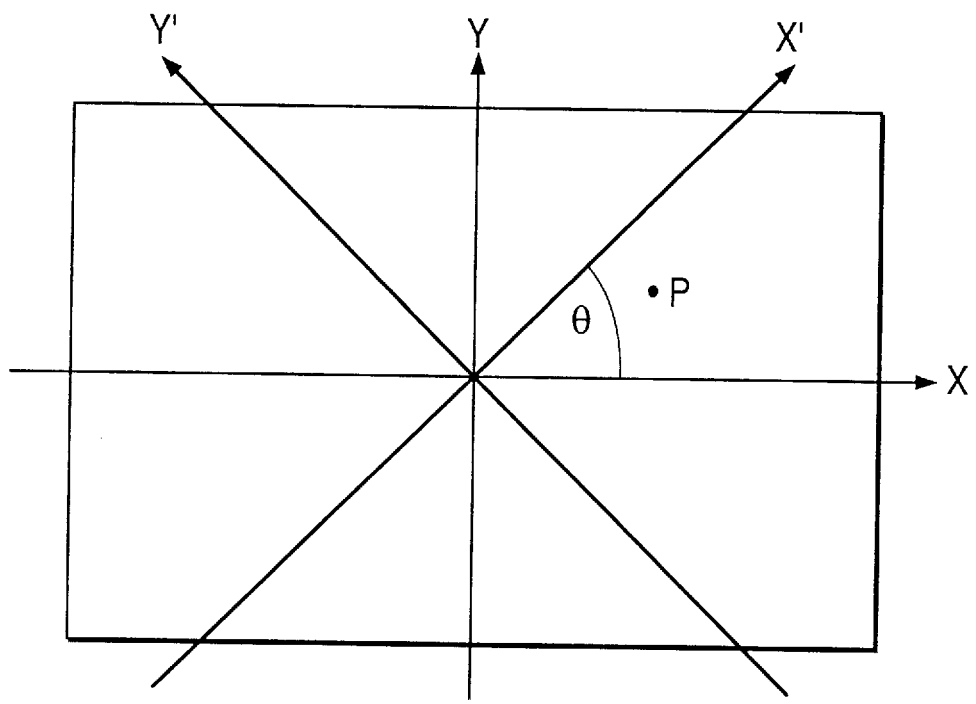
FIG. 2 is a chart of a coordinate system for use in the shift optical system driver according to the first embodiment of the present invention.

FIG. 2 shows a coordinate system used by an external equipment 13 wherein coordinates are set in the vertical and horizontal directions, i.e. the X-Y axis on the imaging plane. A location P is shown in this coordinate system. The X'-Y' axis corresponds to, for example, the coordinate system of the anti-vibration optical system 1. If the coordinates are tilted at angle θ with each axis crossing at a right angle, the location on the X'-Y' axis P(x, y) is given by:

$$x' = X \cdot \cos(-\theta) + y \cdot \sin(=\theta) \quad \text{[Equation 1]}$$

$$y' = X \cdot \sin(=\theta) + y \cdot \cos(=\theta) \quad \text{[Equation 2]}$$

Furthermore, the necessary movement amount on the image plane and the movement amount of anti-vibration optical system 1 are not always in a one to one ratio, but rather related by a multiplying factor K, i.e. the scales of the coordinate systems differ. Therefore, the following conversion may be required:

$$x' = k \cdot x' \quad \text{[Equation 3]}$$

$$y' = k \cdot y' \quad \text{[Equation 4]}$$

Additionally, coordinate data can be given with a certain unit value, such as μm. In such a case, a conversion, carried out by replacing the coordinate data with a multiple of the resolution P of an encoder 5, is required to facilitate accurate control as follows:

$$x' = x'/p \quad \text{[Equation 5]}$$

$$y' = y'/p \quad \text{[Equation 6]}$$

The above example is useful where the moving direction of anti-vibration optical system 1 and the moving direction of the optical axis match. It will be recognized that it may be necessary to reverse the coordinates for an optical system wherein the moving direction of the optical axis is reversed.

In the anti-vibration device, according to the first preferred embodiment of the present invention, the control device 6 disregards the data from compensation amount calculator 4 when data is received from the coordinate converter 12, thereby inhibiting the anti-vibration drive operation of anti-vibration optical system 1. The control device 6 continues to disregard the data from the compensation amount calculator 4 until a command to commence anti-vibration drive is sent.

During this time, the control device 6 controls the driver 2 based on the coordinate data received from the coordinate converter 12, driving the optical axis to the desired point. Control is carried out in a manner similar to the control that is performed during normal anti-vibration operation.

Additionally, after the optical axis has been driven to the desired point, as determined from feedback from the encoder 5, a signal is transmitted from control device 6 to communication device 11, thereby providing the ability for the external equipment 13 to determine that the drive has been completed.

Furthermore, even before the drive action has been completed, the data from the encoder 5 can be sent from the control device 6 to the communication device 11, or the data from the encoder 5 may be sent to the coordinate converter 12, in order for the coordinate converter 12 to perform the aforementioned coordinate conversion and to thereafter transmit the current position to the communication device 11.

During a testing process on the anti-vibration device using an external equipment, a desired position for the anti-vibration optical system 1 is inputted by the external equipment 13 and the performance of the anti-vibration device is tested, for example, by a laser beam. The driving capability can also be confirmed based on the time it takes the anti-vibration optical system 1 to move to a desired position. Furthermore, as noted before, it is possible to output the current location to the external equipment 13 from the communication device 11, allowing not only mean movement speed, but also acceleration characteristics of the anti-vibration optical system 1 to be verified.

Although the first embodiment of the present invention has been described with respect to a particular configuration for the anti-vibration device, i.e., the shift optical system driver, it will be recognized that the first embodiment is not limited to the particular configuration and modifications and changes are possible. For example, while the communication device 11 has been described as interfacing with testing equipment, it will be recognized that the communication device also allows connection to other types of external equipment, and more specifically, the ability to provide add-ons and upgrades to the existing shift optical system. For example, the communication device 11 can interface with new and improved anti-vibration devices providing superior methods than those available at the time of the system's manufacture.

Figure 3:
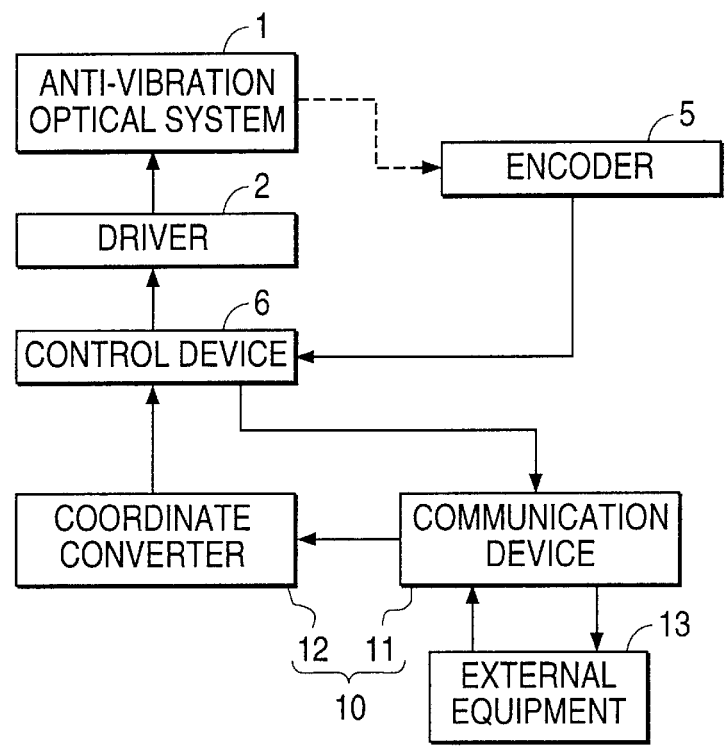
FIG. 3 is a block diagram of a shift optical system driver according to a second preferred embodiment of the present invention.
Figure 4:
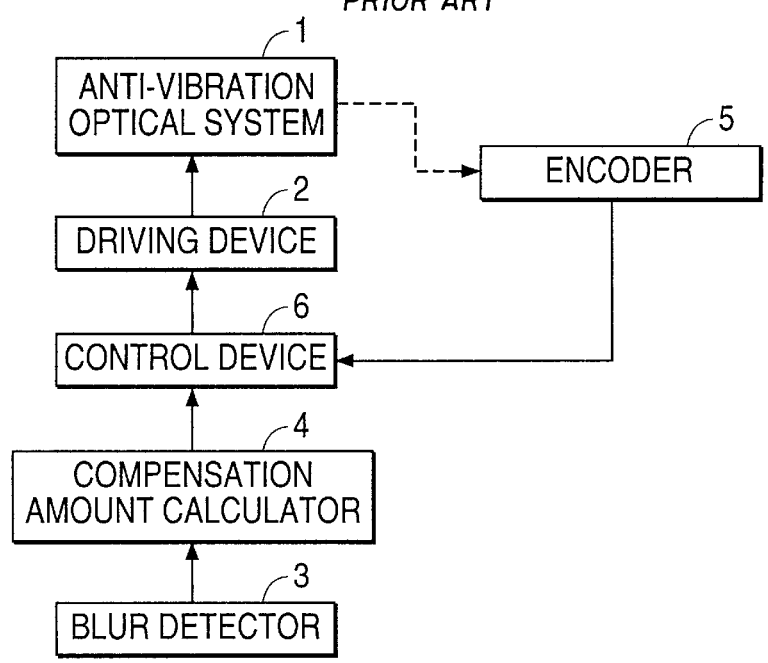
FIG. 4 is a block diagram of an anti-vibration device according to the prior art which corrects for blur in an image of a photographic optical system.

FIG. 3 is a block diagram showing a second preferred embodiment of an anti-vibration device according to the present invention. The anti-vibration device according to the second preferred embodiment is useful for applications other than anti-vibration measures. Basically, the image blur detector 3 and the compensation amount calculator 4 have been eliminated from the anti-vibration device as set forth in the first preferred embodiment. With this configuration, the optical axis of the anti-vibration optical system 1 may be freely moved by the external equipment 13 for anti-vibration purposes, or for other purposes. This is useful, for example, for taking a portrait with a night view in the background. In such a situation, if the optical axis of the anti-vibration optical system 1 is moved in a specified pattern during exposure, with strobe lighting, and the subsequent exposure is prolonged for an extended period of time, the night view in the background will show a pattern caused by the flash. For example, a group of coordinates data may be set, using time as a parameter, to form, for example, a star or heart shape.

A group of these coordinate data may be received sequentially by the communications device 11, thereby achieving the layout of the aforementioned pattern. Additionally, a group of coordinate data may be stored in the camera's CPU, extended accessories such as a data back or, in the lens CPU. Further, the command to use the data thereof may be sent from the external equipment 13 comprising, for example, an electronic diary book.

Although the second embodiment of the present invention has been described with respect to a particular configuration, it will be recognized that the second embodiment is not limited to the particular configuration and modifications and changes are possible. For example, although the second embodiment has been described with respect to entering the coordinate data from the external equipment 13, via the communication device 11, it will be recognized that the coordinate data may be entered via dedicated setting devices, such as switches or command dials, on the camera body.

According to embodiments of the present invention, as it is possible to externally control the position of an anti-vibration optical system, or any shift optical system as needed, a thorough test of the system can be performed using external equipment.

Furthermore, a system is provided that employs an anti-vibration optical system to produce patterns in the photographs, thereby increasing the value of a camera.

Although a few preferred embodiments of the present invention have been shown and described, it would be appreciated by those skilled in the art that changes may be made in these embodiments without departing from the principles and spirit of the invention, the scope which is defined in the claims and their equivalents. For example, although the embodiments have been described with respect to using an anti-vibration optical system as a shift optical system, it will be recognized that any shift optical system is applicable, not just a dedicate anti-vibration optical system.

What is claimed is:

1. An optical system comprising:
   a shift optical system having an optical axis, said shift optical system movable on a plane perpendicular to the optical axis;
   a control device for controlling the movement of said shift optical system; and
   an optical system positioning device adapted to provide said control device with a signal using a first coordinate system indicative of a desired position of said shift optical system in response to a signal using a second coordinate system from a device external of a structure housing the optical system.

2. An optical system, as set forth in claim 1, wherein said optical system positioning device comprises:
   a communication device for receiving a signal from the external device; and
   a coordinate converter connected between said control device and said communication device, said coordinate converter converting the signal using a second coordinate system from the external device to a signal using the first coordinate system.

3. An optical system, as set forth in claim 1, wherein the device is a testing device which sends a signal indicating a position using a second coordinate system to said optical system positioning device.

4. An optical system, as set forth in claim 2, wherein said coordinate converter uses a common coordinate system.

5. An optical system, as set forth in claim 1, further comprising:
   a position detection device that outputs a signal indicative of the position of said shift optical system to said control device; and
   wherein said control device transmits a signal indicative of the position of said shift optical system to an external device via said communication device.

6. An optical system, as set forth in claim 1, further comprising:
   an image blur detector for outputting a signal indicative of vibration in said shift optical system;
   a compensation amount calculator connected to said image blur detector for outputting a signal to said control device indicative of a position to move said shift optical system to compensate for the vibration.

7. An optical system, as set forth in claim 6, wherein said control device ignores the signal from said compensation amount calculator when a valid signal is received from said optical system positioning device.

8. An optical system, as set forth in claim 7, wherein said optical system positioning device comprises:
   a communication device for receiving a signal from the external device; and
   a coordinate converter connected between said control device and said communication device, said coordinate converter converting the signal using a second coordinate system from an external device to a signal using the first coordinate system.

9. An optical system, as set forth in claim 8, wherein a testing device sends a signal using a second coordinate system to said optical system positioning device. device.

10. An optical system, as set forth in claim 8, wherein said coordinate converter uses a common coordinate system.

11. An optical system, as set forth in claim 7, further comprising:
    a position detection device that outputs a signal indicative of the position of said shift optical system to said control device; and
    wherein said control device transmits a signal indicative of whether said shift optical system has reached the desired position to an external device via said communication device.

12. An optical system comprising:
    a shift optical system having an optical axis, said shift optical system movable on a plane perpendicular to the optical axis;
    a disconnectable external device outputting a signal using a second coordinate system, said external device being external of a structure housing said shift optical system;
    a control device for controlling the moment of said shift optical system;
    an optical system positioning device including
      a communication device for outputting and receiving the signal from the external device; and
      a coordinate converter connected between said control device and said communication device, said coordinate converter converting the signal from the external device to a signal using a first coordinate system indicative of a desired position for said shift optical system and outputting said signal to said control device; and
    a position detection device that outputs a signal indicative of the current position of said shift optical system to said control device.

13. An optical system, as set forth in claim 12, further comprising:
    an image blur detector for outputting a signal indicative of vibration in said shift optical system; and
    a compensation amount calculator connected to said image blur detector for outputting a signal to said control device indicative of a position to move said shift optical system to compensate for the vibration.

14. An optical system, as set forth in claim 13, wherein said control device ignores the signal from said compensation amount calculator when the signal is received from said coordinate converter.

15. A method for testing an anti-vibration optical system comprising:

supplying a signal externally of the anti-vibration optical system to a control device, the signal being indicative of a predetermined coordinate location and causing the anti-vibration optical system to move to the predetermined coordinate location;

measuring a location and at least one of a speed, and a movement time of the anti-vibration optical system after the signal is supplied; and comparing the obtaining measurements to target values to determine whether the anti-vibrational optical system is operating within a predetermined tolerance.

* * * * *